US006741397B2

(12) United States Patent
Kitabayashi

(10) Patent No.: US 6,741,397 B2
(45) Date of Patent: May 25, 2004

(54) APPARATUS FOR MANUFACTURING OPTICAL DEVICE

(75) Inventor: Masashi Kitabayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/255,587

(22) Filed: Sep. 27, 2002

(65) Prior Publication Data

US 2003/0063392 A1 Apr. 3, 2003

(30) Foreign Application Priority Data

Sep. 27, 2001 (JP) ......................................... 2001-298158

(51) Int. Cl.[7] .............................................. G02B 27/10
(52) U.S. Cl. ............................ 359/634; 353/33; 353/81
(58) Field of Search ....................... 359/634; 353/31–34, 353/38, 81; 349/9; 348/336–339

(56) References Cited

U.S. PATENT DOCUMENTS 5,739,875 A * 4/1998 Toide et al. ................. 348/744
6,364,492 B1 * 4/2002 Fujimori et al. ............. 353/119
6,452,710 B1 * 9/2002 Hiraga et al. ................ 359/244
6,588,905 B2 * 7/2003 Sekine .......................... 353/20

* cited by examiner

Primary Examiner—Jordan M. Schwartz
Assistant Examiner—Jessica Stultz
(74) Attorney, Agent, or Firm—Oliff & Berridge, PLC

(57) ABSTRACT

An apparatus for manufacturing an optical device in which energy can be saved is provided. The apparatus for manufacturing an optical device performs mutual position adjustment of three liquid crystal panels, which are to be fixed to a cross dichroic prism. The apparatus includes an adjusting light source device having light-emitting diodes, each of which emits a colored light ray, which are used as light sources; a luminous flux detector to detect a luminous flux which is emitted from the adjusting light source device and which is combined in the cross dichroic prism; and a six-axis position adjusting unit to adjust the position of each of the liquid crystal panels based on the result obtained from the detection at the luminous flux detector. By using light-emitting diodes, energy can be saved, the cost for manufacturing the optical device can be reduced, and the adjusting light source device can be miniaturized.

5 Claims, 14 Drawing Sheets

[FIG. 1]
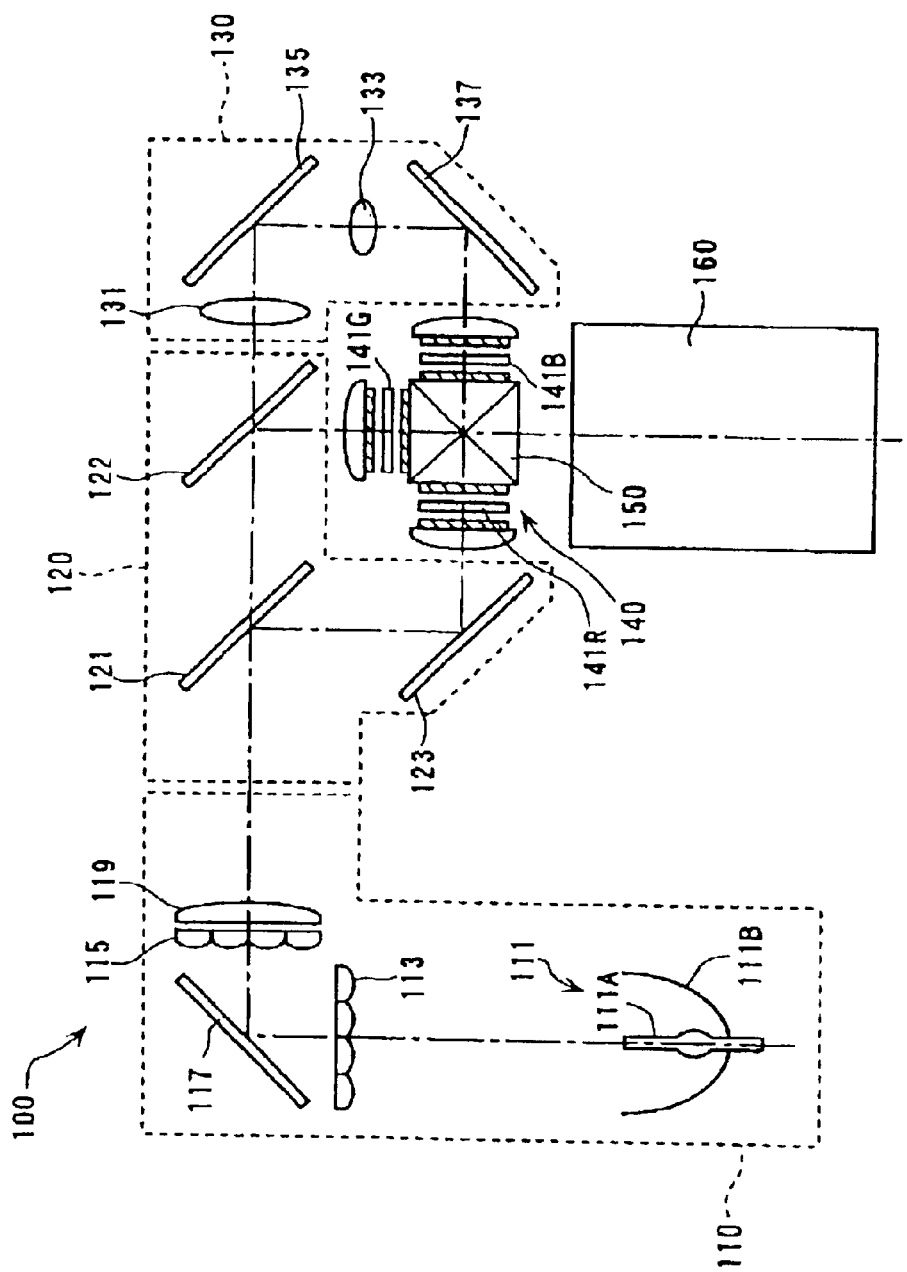

[FIG. 2]
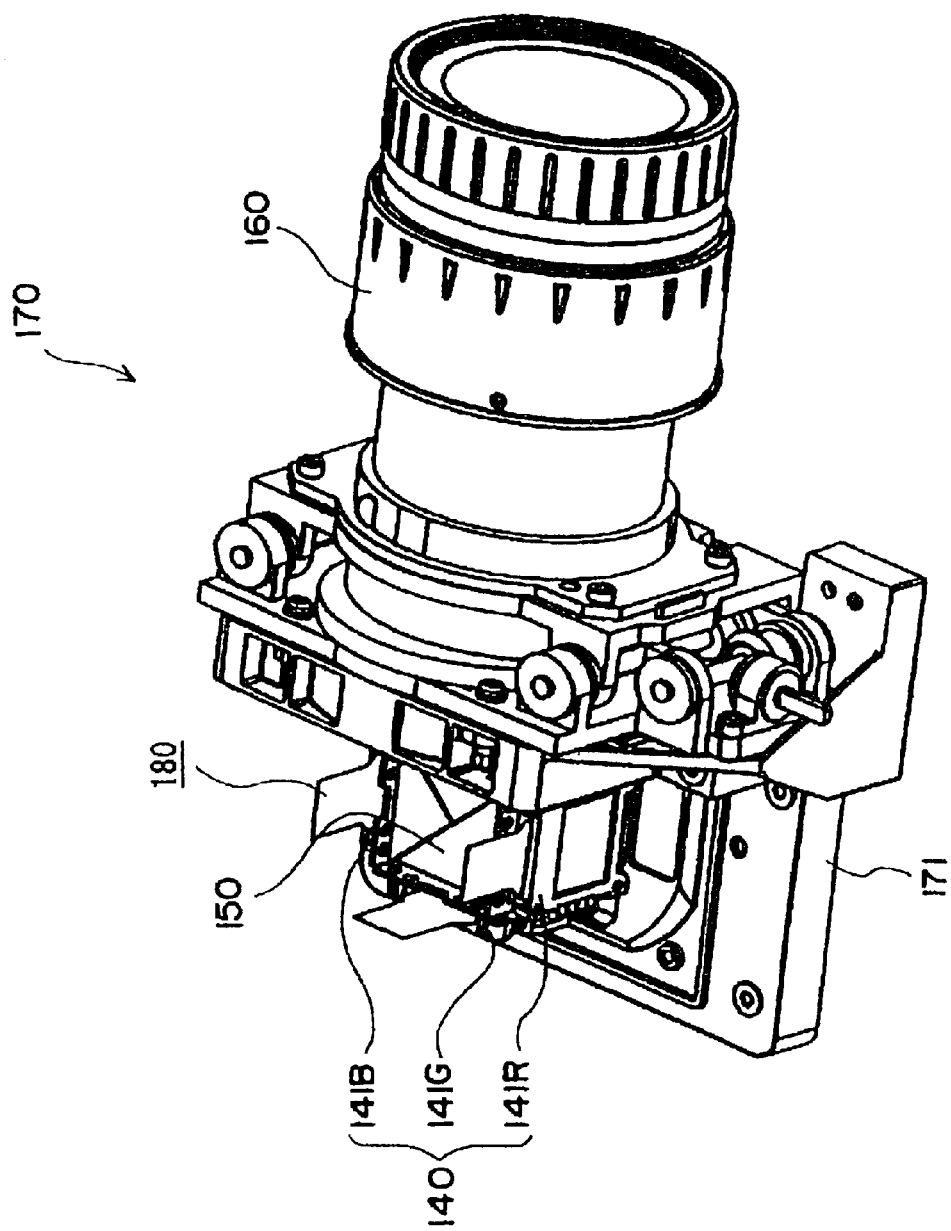

[FIG. 3]
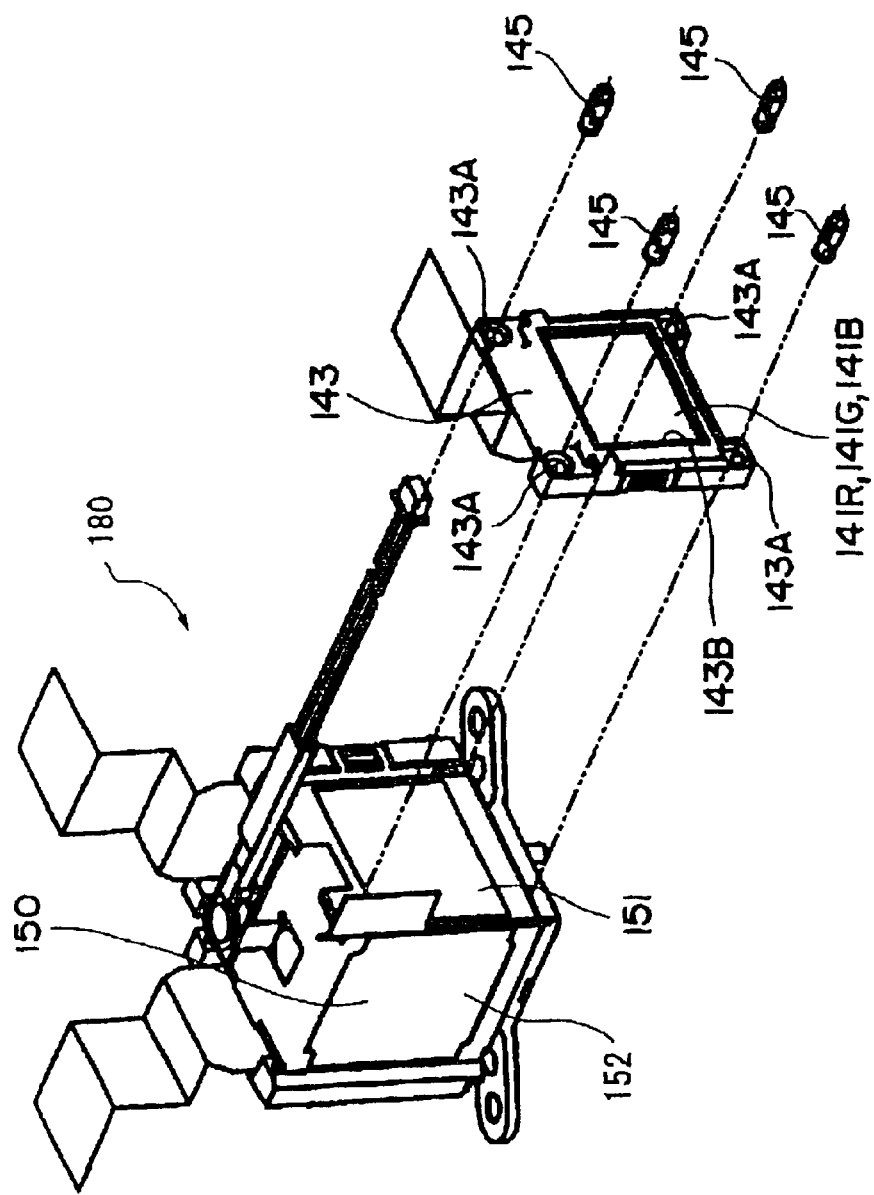

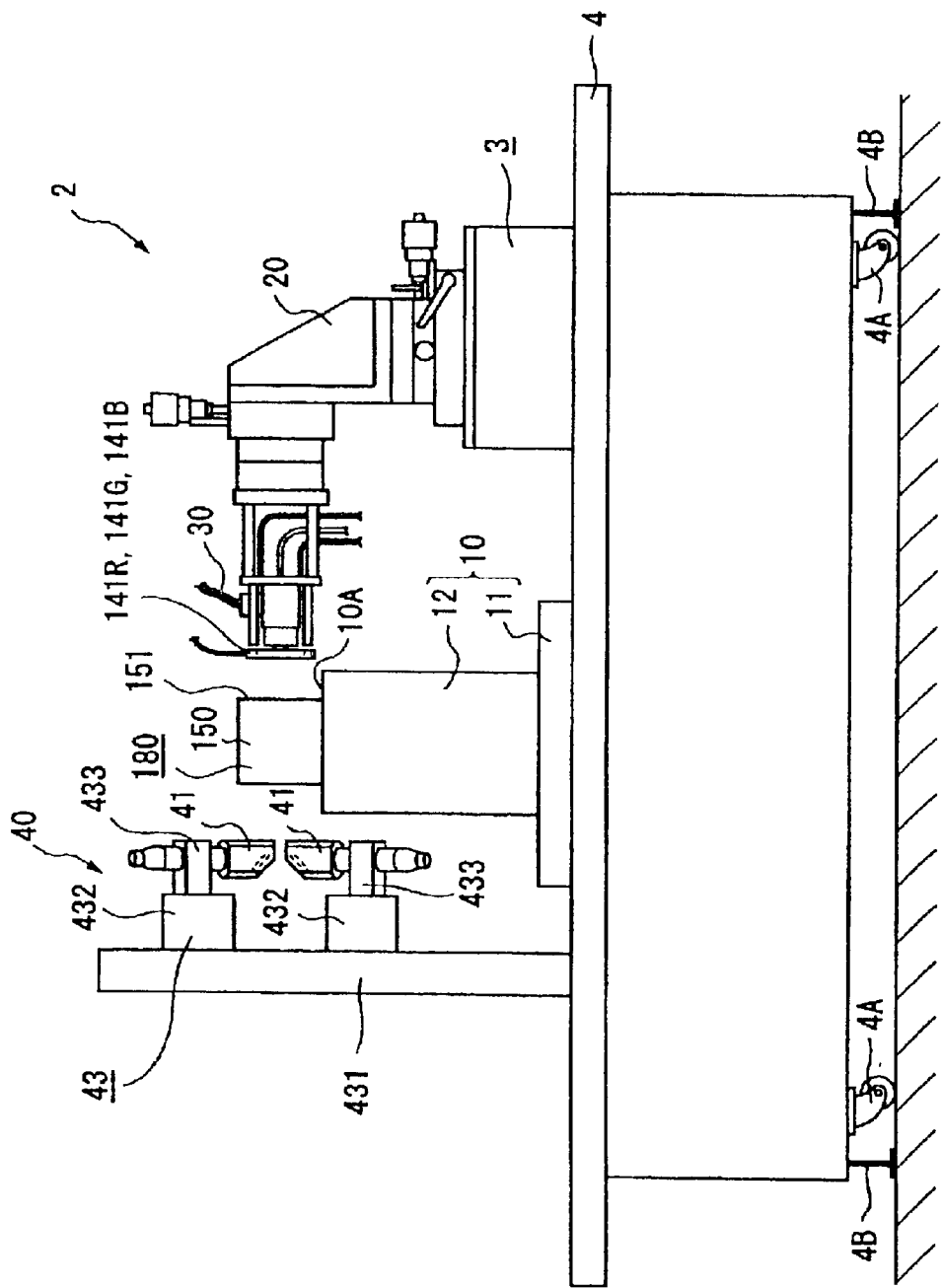
[FIG. 4]

[FIG. 5]
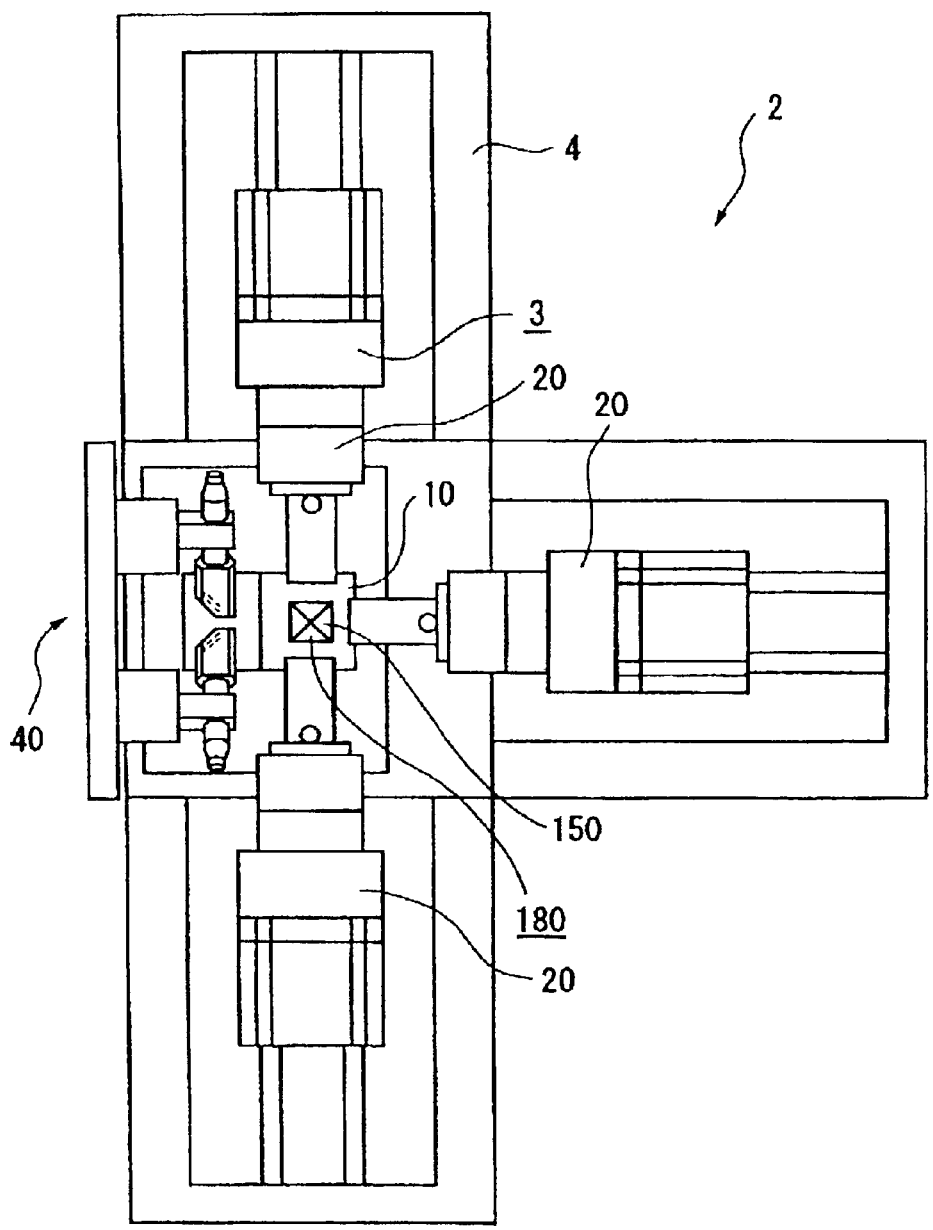

[FIG. 6]
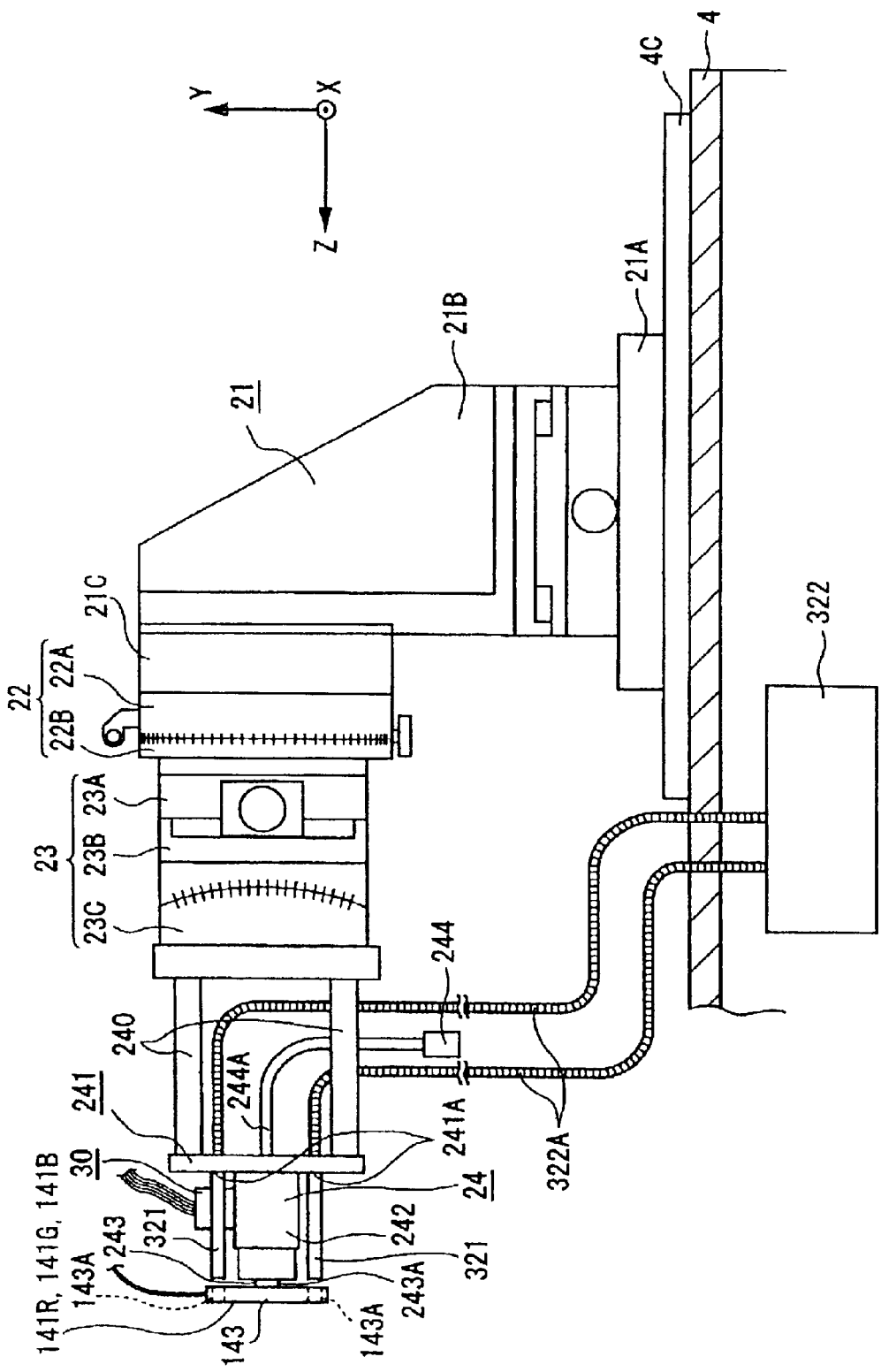

[FIG. 7]
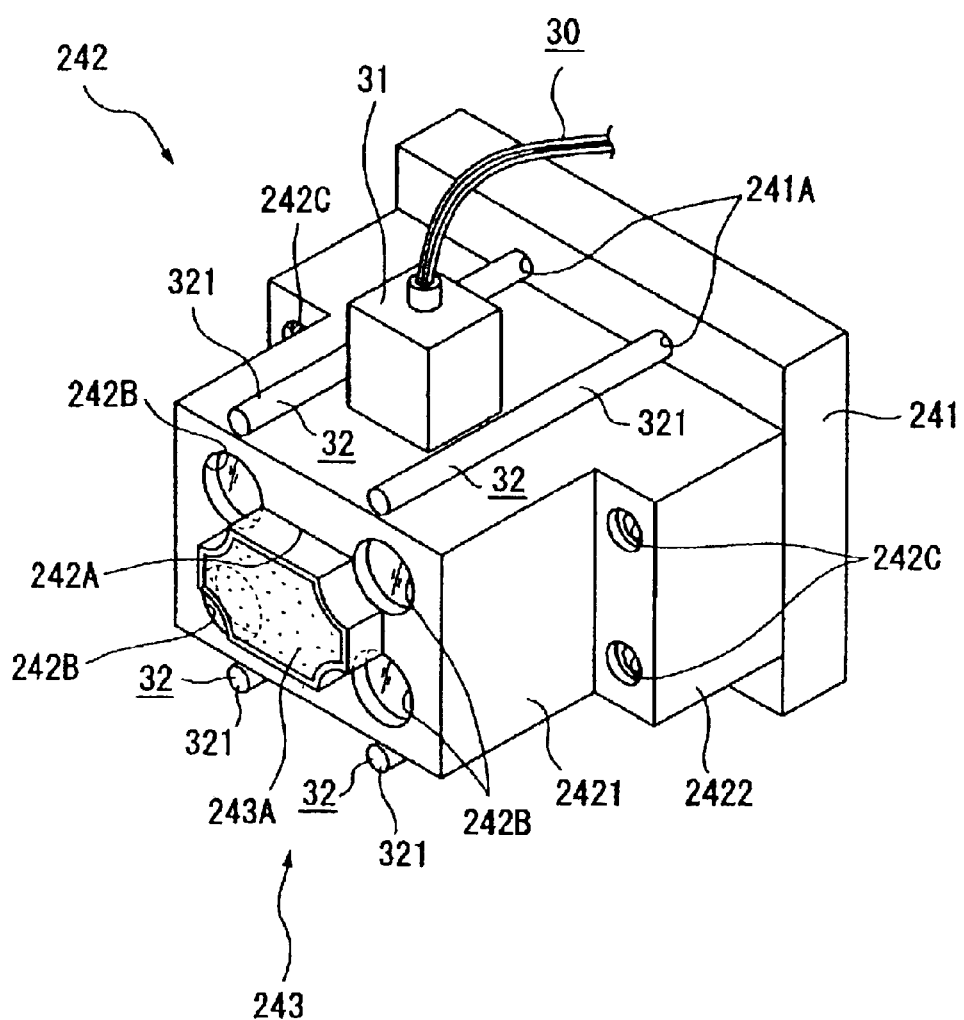

[FIG. 8]
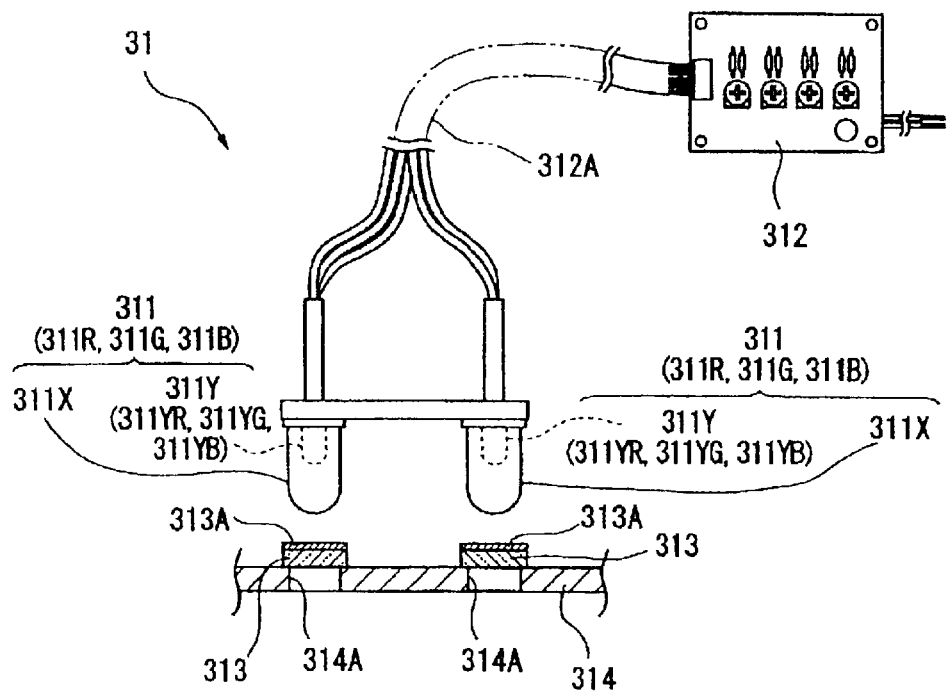
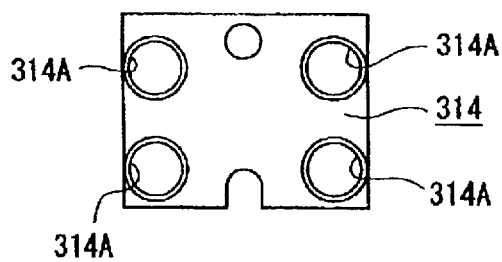

[FIG. 9]
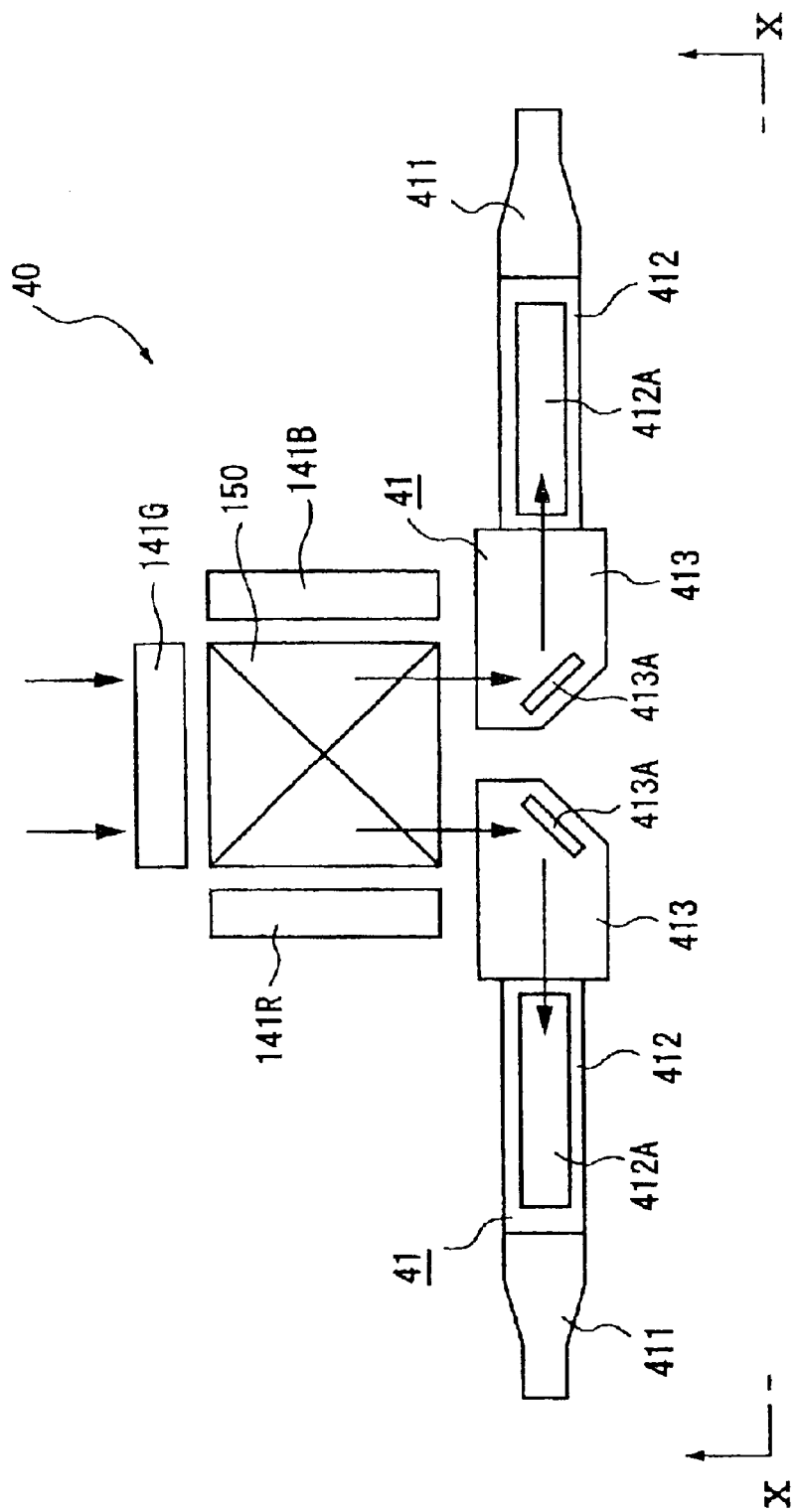

[FIG. 10]
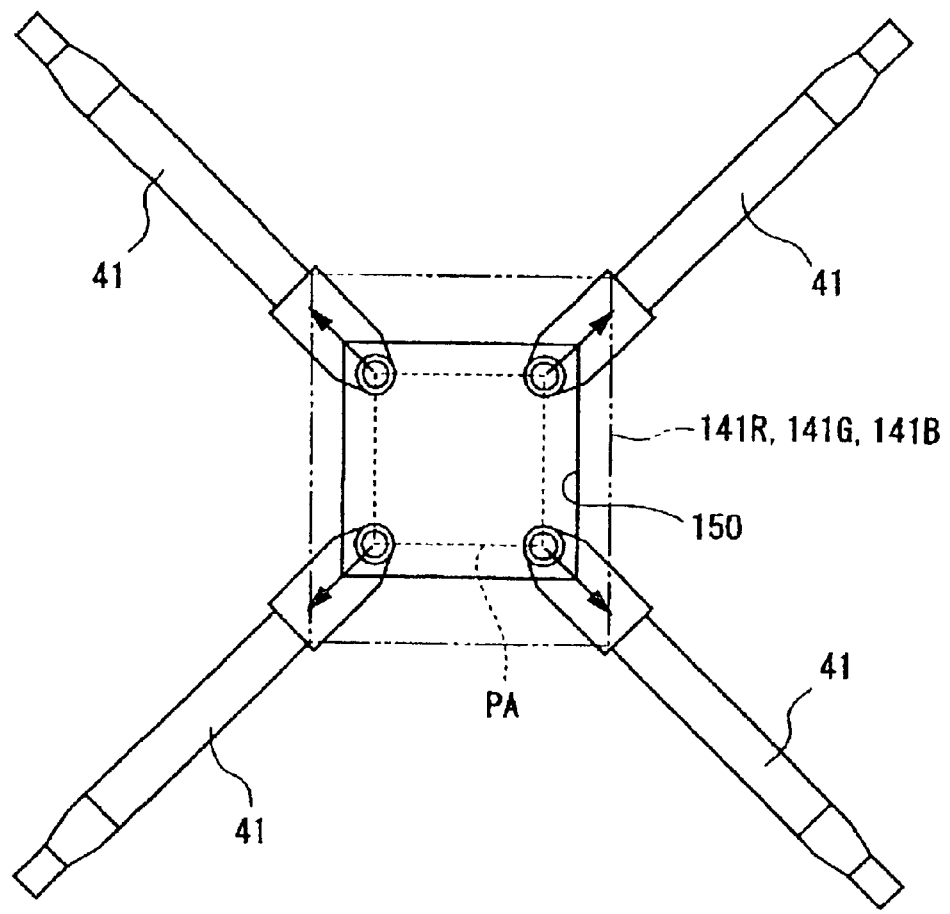
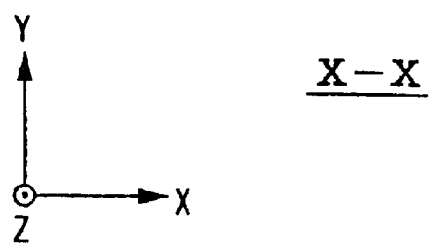
X-X

[FIG. 11]
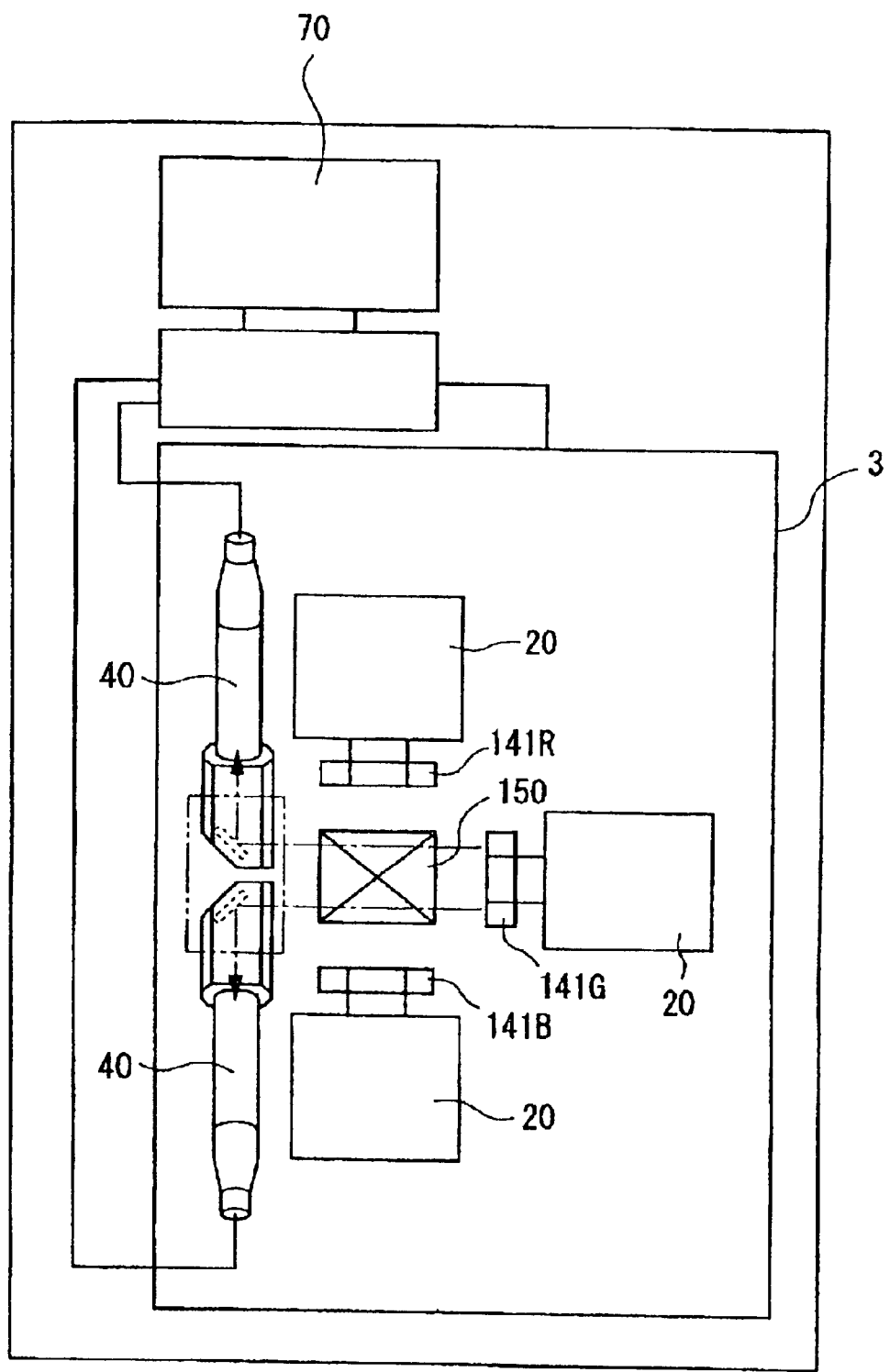

[FIG. 12]
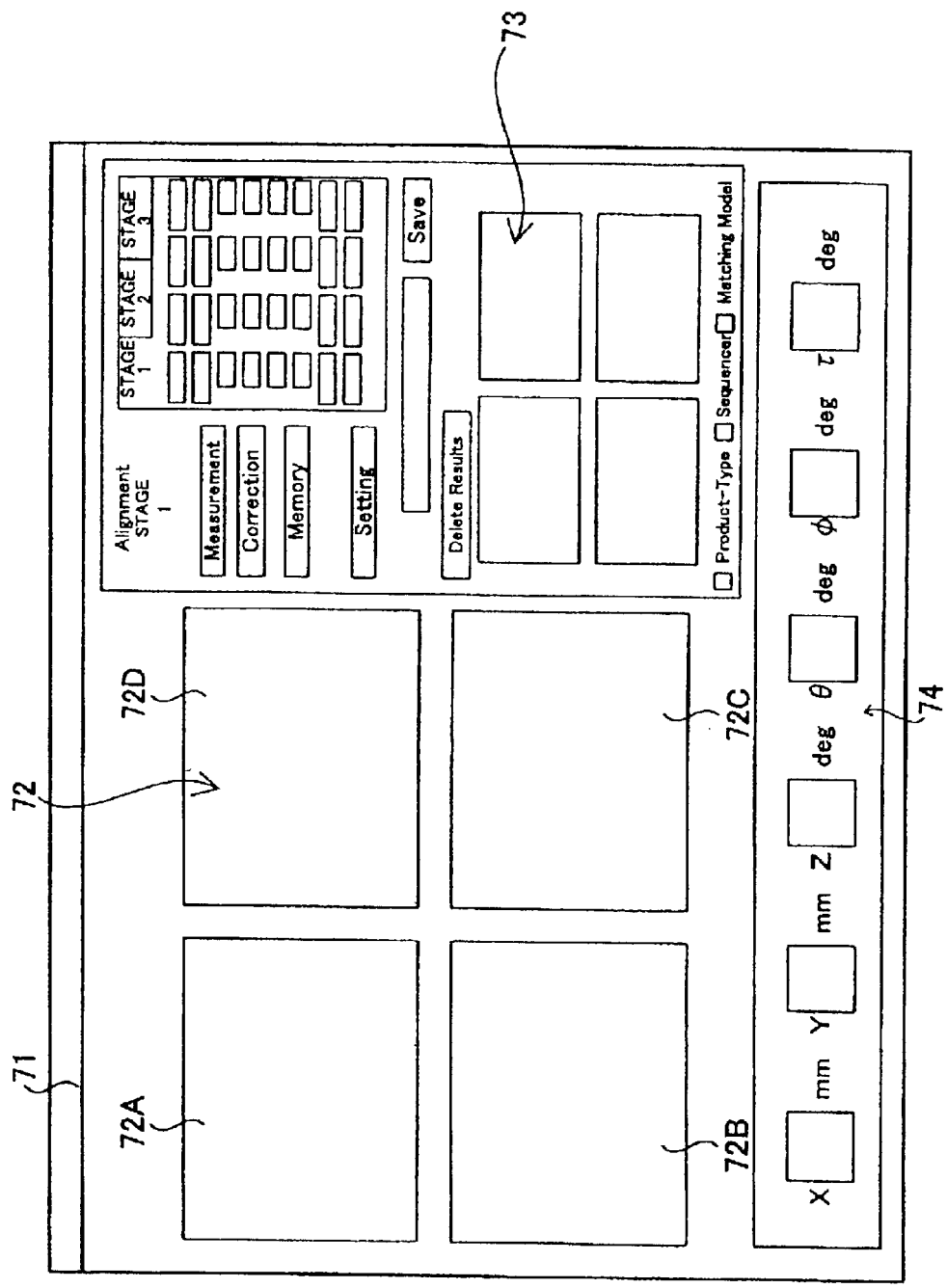

[FIG. 13]
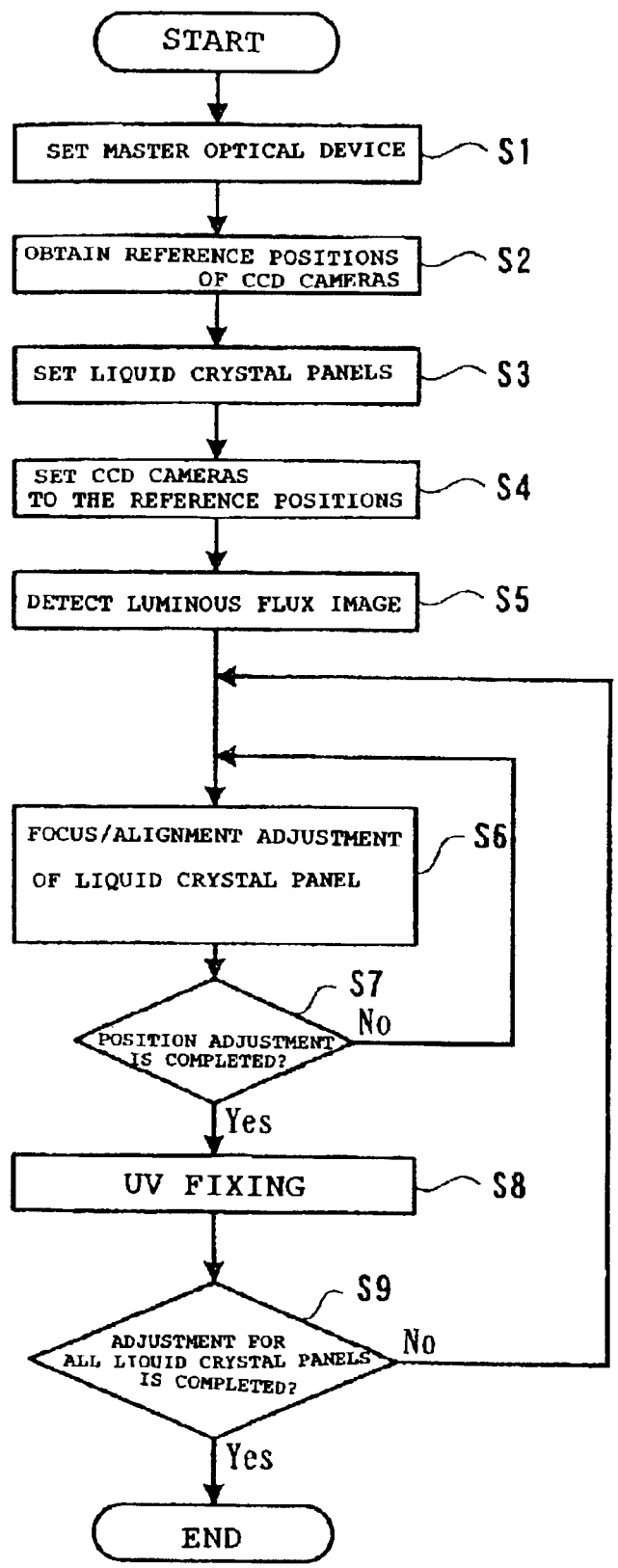

[FIG. 14]
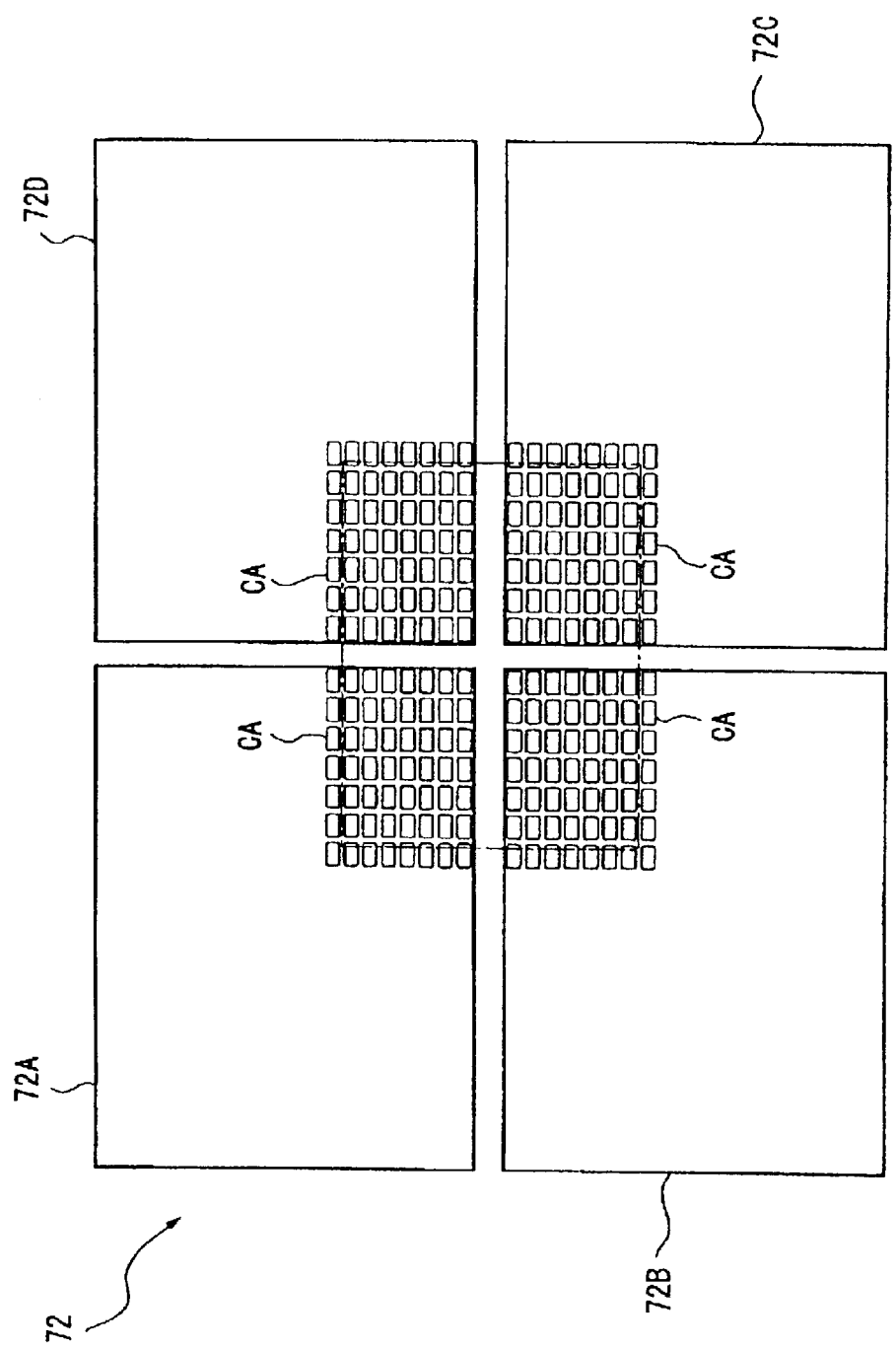

APPARATUS FOR MANUFACTURING OPTICAL DEVICE

BACKGROUND OF THE INVENTION

1. Field of Invention

The present invention relates to an apparatus for manufacturing an optical device.

2. Description of Related Art

A related art projector includes a plurality of light modulators (liquid crystal panels) to modulate a plurality of colored light rays in accordance with image information; a color-combining optical system (cross dichroic prism) to combine the colored light rays modulated by the light modulators; and a projection optical system (projection lens) to enlarge and project luminous fluxes generated at the color-combining optical system so as to form a projected image. An example of this type of projector is a so-called three-panel-type projector, in which a luminous flux emitted from a light source is separated into light rays of three colors of red, green, and blue, by a dichroic mirror, each of the light rays is modulated by each of three liquid crystal panels in accordance with image information, the luminous fluxes after modulation are combined by a cross dichroic prism, and a color image is enlarged and projected by a projection lens.

In order to obtain a clear projection image with the projector, mutual focus/alignment adjustment of each of the liquid crystal panels must be performed with high accuracy when the projector is manufactured, so as to reduce or prevent misalignment of pixels in each of the liquid crystal panels and displacement in the distance from the projection lens. The "focus adjustment" means adjustment to accurately place each of the liquid crystal panels at a back focus position of the projection lens. The "alignment adjustment" means adjustment to match the pixels of each of the liquid crystal panels. This is also applied to the description below.

Focus/alignment adjustment of the liquid crystal panels is performed for an optical device including the three liquid crystal panels and a cross dichroic prism, by (1) radiating a luminous flux from a metal halide lamp as an adjusting light source device to an image forming region of each of the liquid crystal panels, (2) detecting the luminous flux which enters a light-incident surface of the cross dichroic prism and which is emitted from a light-emitting surface thereof by a luminous flux detector such as a CCD camera, and (3) adjusting the relative positions of the liquid crystal panels by a position adjusting device, while the focus and pixel position of each of the liquid crystal panels, detected by the luminous flux detector, are checked.

Then, each of the liquid crystal panels, whose position is adjusted, is fixed by using ultraviolet curing adhesive so as to manufacture the optical device with high accuracy.

SUMMARY OF THE INVENTION

However, the metal halide lamp which is used as an adjusting light source device, and which is used for manufacturing the optical device, consumes a large amount of electrical power and is easily worn out. Accordingly, the cost of the adjusting light source device increases and as a result, the cost for the optical device increases. Furthermore, the metal halide lamp has a large external dimension, and thus the adjusting light source device cannot be miniaturized.

Accordingly, the present invention provides an apparatus for manufacturing an optical device in which energy can be saved and an inexpensive optical device can be manufactured by reducing the cost for an adjusting light source device and in which the adjusting light source device can be miniaturized.

An apparatus for manufacturing an optical device according to the present invention performs mutual position adjustment of each of a plurality of light modulators and fixes each of the light modulators to a light-incident surface of a color-combining optical system, in order to manufacture the optical device including the plurality of light modulators, each of which modulates each of a plurality of colored light rays according to image information, and the color-combining optical system to combine the colored light rays modulated in the light modulators. The apparatus includes an adjusting light source device including a plurality of light sources to supply colored light rays to be modulated to each of the light modulators; a luminous flux detector to detect a luminous flux emitted from the adjusting light source device and passed through each of the light modulators and the color-combining optical system; and a position adjusting device to adjust the position of each of the light modulators based on the luminous flux detected by the luminous flux detector. The light sources include self-light-emitting elements.

A CCD camera or the like, which includes an image pickup device such as a CCD, an image-taking device to take a signal detected by the image pickup device, and a processor to process the taken image, can be used as the luminous flux detector.

Also, various types of self-light-emitting elements, for example, a light-emitting diode (LED), an organic electro luminescence (EL) element, and a silicon light-emitting element can be used as the self-light-emitting elements. Any type of self-light-emitting element can be used as long as the element self-emits light semipermanently by being applied with a current, voltage, or electrical field externally.

Herein, the "self-light-emitting element" means an element which emits light when electron transitions are caused between energy levels, and a generated luminous flux has a single wavelength. On the other hand, a range of wavelength recognized as colored light is: 588 nm or more for red light, 502 to 569 nm for green light, and 501 nm or less for blue light. Accordingly, in order to form a light source corresponding to each colored light ray, a wavelength as a single wavelength must be selected from within the range of wavelength corresponding to each colored light ray so as to specify the wavelength. For example, 613 nm for red light, 525 nm for green light, and 470 nm for blue light can be selected and specified.

The power consumption of a known metal halide lamp is about 150 W, and the life thereof is about 750 hours. On the other hand, an LED as a self-light-emitting element has a power consumption of about 3.6 W and the life is semipermanent. Also, a self-light-emitting element is not a discharge light source different from a metal halide lamp, and thus the external dimension is fairly small compared to that of the metal halide lamp. Accordingly, a self-light-emitting element is greatly different from a metal halide lamp in the points of power consumption, life, and external dimension.

According to the present invention, since the above-described self-light-emitting element is adopted as the light source of the adjusting light source device, the power consumption when the optical device is manufactured can be reduced compared to the case where a known metal halide lamp is used. Also, the self-light-emitting element can be used semipermanently as the light source of the adjusting light source device. Therefore, energy can be saved, the cost for the adjusting light source device can be reduced, and thus the cost for manufacturing the optical device can be reduced. In addition, the adjusting light source device and the apparatus for manufacturing the optical device can be miniaturized.

Preferably, the adjusting light source device includes a diffusion plate on the subsequent stage of each of the light sources in the apparatus for manufacturing the optical device.

In general, the luminous flux emitted from the self-light-emitting element is a diffused light without directivity. Thus, when the light source has a spherical casing to accommodate a self-light-emitting element, and when a diffused light from the self-light-emitting element is directly radiated to the light modulator, such as a liquid crystal panel, the light is projected in substantially a circular-shape due to the spherical-shape of the light source in each of rectangular pixels in the image forming region of the liquid crystal panel. Thus, four corners of each pixel are not projected adequately.

However, by placing the diffusion plate on the subsequent stage of the self-light-emitting element, the diffused light emitted from the self-light-emitting element so as to project the light modulators in a spherical shape can be converted to diffused light corresponding to the shape of the light modulators by the diffusion plate. Thus, the whole of the light modulators can be projected accurately. Accordingly, accurate detection can be performed by the luminous flux detector, and thus the optical device can be manufactured with higher accuracy.

Preferably, the light-emitting elements are placed corresponding to four corners of the rectangular image forming region of each of the light modulators.

In this case, when the light-emitting elements emit light to the four corners of the image forming region and the corresponding luminous flux detector detects the four corners, a plurality of pixel regions in one light modulator can be detected. Accordingly, adjustment can be performed with high accuracy by the position adjusting device based on the detection result at all imaging points.

Further, the self-light-emitting element is preferably a light-emitting device (LED).

Herein, the LED has three advantages: first, three types of LED, that is, red, green, and blue, can be easily made simply by changing the semiconductor material or additives; second, the LED does not generate heat; and third, the light emission can be switched ON/OFF rapidly.

Accordingly, by using the LED, an optical device to modulate light rays of three colors can be easily manufactured with the first advantage. Also, overheating in other portions in the apparatus can be reduced or prevented and the apparatus can be easily used with the second advantage. Further, the optical device can be rapidly manufactured with the third advantage.

Preferably, the plurality of light sources includes a red LED, a green LED, and a blue LED.

With this arrangement, by preparing three light modulators to modulate each of red light, green light, and blue light, and by providing the color LED for each of the three light modulators, the optical device which can perform full-color output can be easily manufactured.

BRIEF DESCRIPTION OF THE DRAWINGS

FIG. 1 is a schematic showing a projector including an optical device manufactured by an apparatus for manufacturing the optical device according to an embodiment of the present invention;

FIG. 2 is a perspective view showing the critical portion of the projector;

FIG. 3 is an exploded perspective view showing the optical device according to the embodiment;

FIG. 4 is a side view showing the apparatus for manufacturing the optical device;

FIG. 5 is a schematic of the apparatus for manufacturing the optical device as viewed from the upper side;

FIG. 6 is a schematic that shows a significant portion of the apparatus for manufacturing the optical device;

FIG. 7 is an enlarged perspective view showing a significant portion of a liquid crystal panel holder;

FIG. 8 is a schematic that shows a significant portion of an adjusting light source device;

FIG. 9 is a schematic showing a luminous flux detector;

FIG. 10 is a front view showing the luminous flux detector as viewed from line X—X in FIG. 9;

FIG. 11 is a schematic showing the apparatus for manufacturing the optical device;

FIG. 12 is a schematic that shows a display screen of a computer;

FIG. 13 is a flowchart for explaining a method for manufacturing the optical device;

FIG. 14 is a schematic that shows a reference pattern in the display screen.

DETAILED DESCRIPTION OF PREFERRED EMBODIMENTS

Hereinafter, an embodiment of the present invention will be described with reference to the drawings.

1. Construction of Projector

FIG. 1 is a schematic that shows the construction of a projector 100 including an optical device having a plurality of light modulators to be adjusted and a color-combining optical system.

The projector 100 includes an integrator illumination optical system 110, a color-separation optical system 120, a relay optical system 130, an electro-optical device 140, a cross dichroic prism 150 functioning as a color-combining optical system, and a projection lens 160.

The integrator illumination optical system 110 includes a light source unit 111 having a light source lamp 111A and a reflector 111B, a first lens array 113, a second lens array 115, a reflecting mirror 117, and a superposing lens 119. The direction of a luminous flux emitted from the light source lamp 111A is adjusted by the reflector 111B, the luminous flux is divided into a plurality of luminous fluxes by the first lens array 113, the direction of the luminous fluxes is changed by 90° by the reflecting mirror 117, and the luminous fluxes form images near the second lens array 115. Each of the luminous fluxes emitted from the second lens array 115 enters the superposing lens 119 placed on the subsequent stage such that the central axis (chief ray) of the luminous flux is perpendicular to the incident surface of the superposing lens 119. Further, the plurality of luminous fluxes emitted from the superposing lens 119 are superposed on three liquid crystal panels 141R, 141G, and 141B, which constitute the electro-optical device 140.

The color-separation optical system 120 includes two dichroic mirrors 121 and 122 and a reflecting mirror 123, which function so as to separate the plurality of luminous fluxes emitted from the integrator illumination optical system 110 into light rays of three colors: red, green, and blue.

The relay optical system 130 includes an incident-side lens 131, a relay lens 133, and reflecting mirrors 135 and 137, and functions so as to lead the colored light rays generated in the color-separation optical system 120 to the liquid crystal panels. For example, blue light B is led to the liquid crystal panel 141B.

The electro-optical device 140 includes the three liquid crystal panels 141R, 141G, and 141B as light modulators. Herein, polysilicon TFTs are used as switching elements. The colored light rays generated in the color-separation optical system 120 are modulated by the three liquid crystal panels 141R, 141G, and 141B in accordance with image information to form an optical image.

The cross dichroic prism 150 combines the images formed by modulating each of the colored light rays emitted from the three liquid crystal panels 141R, 141G, and 141B, and forms a color image. In the cross dichroic prism 150, a dielectric multilayer film which reflects red light and a dielectric multilayer film which reflects blue light are formed in substantially an x-shape-along the interfaces of four right-angled prisms, and the light rays of three colors are combined by these dielectric multilayer films. The color image created by the combination at the cross dichroic prism 150 is emitted from the projection lens 160 so as to be enlarged and projected on a screen.

2. Construction of Optical Device

In the projector 100, an optical device 180 including the electro-optical device 140 and the cross dichroic prism 150, and the projection lens 160, which is combined with the optical device 180, are incorporated into an optical unit 170, as shown in FIG. 2. The optical unit 170 includes an L-shaped head body 171 including a magnesium alloy or the like. The projection lens 160 is fixed to the outer side of the perpendicular surface of the L-shaped head body 171 with screws. The cross dichroic prism 150 is fixed to the upper side of the horizontal surface of the L-shaped head body 171 with screws.

The three liquid crystal panels 141R, 141G, and 141B constituting the electro-optical device 140 are placed so as to surround three side surfaces of the cross dichroic prism 150. Specifically, as shown in FIG. 3, each of the liquid crystal panels 141R, 141G, and 141B is accommodated in a holding frame 143. Also, each of the liquid crystal panels is bonded, using an ultraviolet curing adhesive, to a light-incident surface 151 of the cross dichroic prism 150 so as to be fixed to the cross dichroic prism 150, by inserting pins 145 including a transparent resin into holes 143A formed at four corners of the holding frame 143. Accordingly, a so-called panel on prism (POP) structure is achieved. Herein, a rectangular opening 143B is formed in the holding frame 143. Each of the liquid crystal panels 141R, 141G, and 141B is exposed at the opening 143B, and this portion is an image forming region. That is, the light rays of each color R, G, and B are led to the exposed portion of each of the liquid crystal panels 141R, 141G, and 141B, respectively, and an optical image is formed in accordance with image information.

In the optical device 180 adopting the POP structure, focus adjustment, alignment adjustment, and fixing of each of the liquid crystal panels 141R, 141G, and 141B must be performed almost simultaneously when these liquid crystal panels 141R, 141G, and 141B are bonded to the cross dichroic prism 150. Thus, the optical device 180 is usually assembled with the following steps.

(1) A first liquid crystal panel, for example, the liquid crystal panel 141G is bonded to the cross dichroic prism 150. Specifically, the pins 145, which have ultraviolet curing adhesive applied to the tips thereof, are inserted into the holes 143A of the holding frame 143 for the liquid crystal panel 141G.

(2) Next, the tips of the pins 145 are brought into contact with the light-incident surface 151 of the cross dichroic prism 150.

(3) In this state, a luminous flux is introduced to the image forming region of the liquid crystal panel 141G. Then, focus/alignment adjustment of the liquid crystal panel 141G is performed by adjusting the moving position, the plane position, and the rotation position with respect to the light-incident surface 151, while the luminous flux emitted from the cross dichroic prism 150 is viewed directly.

(4) When a suitable focus/alignment is obtained, a fixing luminous flux, that is, ultraviolet light, is radiated from the ends of the pins 145 so as to completely cure the ultraviolet curing adhesive.

(5) The other liquid crystal panels 141R and 141B are bonded in the same way.

Consequently, in order to assemble the optical device 180 adopting the POP structure, a mechanism to adjust mutual focus/alignment of the liquid crystal panels 141R, 141G, and 141B is required. A mechanism to adjust the position will be described below.

3. Construction of Apparatus for Manufacturing Optical Device

Next, an apparatus 2 for manufacturing the optical device will be described with reference to FIGS. 4 to 12.

FIG. 4 is a side view showing the apparatus 2 for manufacturing the optical device. FIG. 5 is a schematic of the apparatus 2 viewed from the upper side.

The apparatus 2 according to the present invention is for manufacturing the optical device 180 by adjusting the relative positions of the liquid crystal panels 141R, 141G, and 141B and by fixing the liquid crystal panels 141R, 141G, and 141B to the cross dichroic prism 150. As shown in FIGS. 4 and 5, the apparatus 2 includes a main body 3 and a mounting table 4 on which the main body 3 is mounted.

As shown in FIG. 4, casters 4A to easily move the main body 3 to an arbitrary place and stoppers 4B to lock the main body 3 so that the main body 3 does not move are provided underneath the mounting table 4.

As shown in FIGS. 4 and 5, the main body 3 includes a pedestal 10, six-axis position adjusting units 20 as position adjusting devices, light source units 30, a luminous flux detector 40, and a computer (not shown in FIG. 4) to control the operation of each of the devices 10, 20, 30, and 40, and to process an image signal detected in the luminous flux detector 40.

3-1 Construction of Pedestal

The pedestal 10 is to mount the cross dichroic prism 150 at a predetermined position on the upper surface 10A thereof. As shown in FIG. 4, the pedestal 10 includes a base plate 11 placed on the mounting table 4, and a main table 12 which is placed on the base plate 11 and on which the cross dichroic prism 150 is mounted.

3-2 Construction of Six-axis Position Adjusting Unit

The six-axis position adjusting units 20 adjust the positions and the relative positions of the liquid crystal panels 141R, 141G, and 141B with respect to the light-incident surfaces 151 of the cross dichroic prism 150. FIG. 6 is a schematic that shows the critical portion of the apparatus 2 for manufacturing the optical device.

As shown in FIG. 6, each of the six-axis position adjusting units 20 includes a plane position adjuster 21 provided movably along a rail 4C on the upper surface of the mounting table 4, an in-plane-rotation position adjuster 22 provided at the end of the plane position adjuster 21, an out-of-plane-rotation position adjuster 23 provided at the end of the in-plane-rotation position adjuster 22, and a liquid crystal panel holder 24 provided at the end of the out-of-plane-rotation position adjuster 23.

The plane position adjuster 21 adjusts the moving position and the plane position of the liquid crystal panel 141R, 141G, or 141B with respect to the light-incident surface 151 (FIG. 4) of the cross dichroic prism 150, and includes a base portion 21A which is slidable on the mounting table 4, a leg portion 21B provided on the base portion 21A, and a connecting portion 21C which is provided at the upper end of the leg portion 21B and to which the in-plane-rotation position adjuster 22 is connected.

The base portion 21A is movable on the mounting table 4 in the Z-axis direction (horizontal direction in FIG. 6) by a drive mechanism, such as a motor (not shown). The leg portion 21B is movable with respect to the base portion 21A in the X-axis direction (direction orthogonal to the plane surface of FIG. 6) by a drive mechanism provided in its side, such as a motor (not shown). The connecting portion 21C is movable with respect to the leg portion 21B in the Y-axis direction (vertical direction in FIG. 6) by a drive mechanism, such as a motor (not shown).

The in-plane-rotation position adjuster 22 adjusts the rotational position in the in-plane direction of the liquid crystal panel 141R, 141G, or 141B with respect to the light-incident surface 151 of the cross dichroic prism 150, and includes a column-shaped base portion 22A fixed to the end of the plane position adjuster 21 and a rotation adjuster 22B which is provided on the base portion 22A and which is rotatable in the circumferential direction of the base portion 22A.

By adjusting the rotational position of the rotation adjuster 22B, the rotational position in the in-plane direction of the liquid crystal panel 141R, 141G, or 141B with respect to the light-incident surface 151 can be adjusted with high accuracy.

The out-of-plane-rotation position adjuster 23 adjusts the rotational position in the out-of-plane direction of the liquid crystal panel 141R, 141G, or 141B with respect to the light-incident surface 151 of the cross dichroic prism 150. The out-of-plane-rotation position adjuster 23 is fixed to the end of the in-plane-rotation position adjuster 22 and includes a base portion 23A whose end portion has a concave curve forming an arc in the horizontal direction, a first adjuster 23B which is provided so as to slide along the arc on the concave curve of the base portion 23A and whose end portion has a concave curve forming an arc in the vertical direction, and a second adjuster 23C provided so as to slide along the arc on the concave curve of the first adjuster 23B.

The first adjuster 23B slides by driving a motor (not shown) provided on the side of the base portion 23A, and the second adjuster 23C slides by driving a motor (not shown) provided on the upper part of the first adjuster 23B. Accordingly, the rotational position in the out-of-plane direction of the liquid crystal panel 141R, 141G, or 141B with respect to the light-incident surface 151 can be adjusted with high accuracy.

The liquid crystal panel holder 24 holds the liquid crystal panel 141R, 141G, or 141B, and includes a base plate 241 fixed via four columns 240 protruding from the end of the second adjuster 23C, a base portion 242 fixed to the end of the base plate 241 with screws, a pad 243 which is accommodated so that the end portion thereof protrudes from the base portion 242 and which is in contact with the liquid crystal panel 141R, 141G, or 141B, and a suction device 244 to vacuum hold the liquid crystal panel 141R, 141G, or 141B via the pad 243.

FIG. 7 is an enlarged perspective view of the base portion 242 of the liquid crystal panel holder 24.

Referring to FIG. 7 as well as FIG. 6, in the base plate 241, circular holes 241A to provide light source members 321 of fixing light source devices 32, which will be described below, are formed at positions corresponding to the holes 143A at the four corners of the holding frame 143 for the liquid crystal panel 141R, 141G, or 141B, above and below the base portion 242, which is fixed to the end of the base plate 241 with screws.

The base portion 242 has a protruding central portion, includes a metallic material, and is a hollow member having a convex cross-section. A cross hole 242A to expose the pad 243 is formed at substantially the center of a rectangular end surface of a protrusion 2421. Also, in the end surface of the protrusion 2421, four circular holes 242B, which will be described below, are formed evenly around the cross hole 242A allow luminous fluxes from an adjusting light source unit 31 to be emitted externally.

Further, four holes 242C are formed in a projection 2422 which externally projects at the back side of the base portion 242. The base portion 242 is fixed to the base plate 241 by inserting screws into the four holes 242C.

The pad 243 is a porous elastic member and includes a main portion (not shown) which is accommodated in the base portion 242 and a cross portion 243A which protrudes from the main portion by a predetermined length and which is formed to be cross-shaped with a size corresponding to the cross hole 242A. When the pad 243 is attached to the base portion 242, the cross portion 234A protrudes from the end surface of the base portion 242. Therefore, the liquid crystal panel 141R, 141G, or 141B is not brought into contact with the base portion 242, but is brought into contact with only the cross portion 243A of the pad 243.

The suction device 244 is not shown in detail, but as shown in FIG. 6, the suction device 244 is provided near the base portion 21A and is connected to the inside of the base portion 242 and near the pad 243 via a predetermined air hose 244A so that the pad 243 holds the liquid crystal panel 141R, 141G, or 141B by vacuum suction.

3-3 Construction of Light Source Unit

Each of the light source units 30 supplies a luminous flux for position adjustment and a luminous flux for fixing to the liquid crystal panel 141R, 141G, or 141B. As shown in FIGS. 6 and 7, the light source unit 30 includes an adjusting light source device 31 to adjust position and fixing light source devices 32 to fix the adjusted liquid crystal panel 141R, 141G, or 141B to the side of the cross dichroic prism 150.

The fixing light source devices 32 emit ultraviolet light to cure an ultraviolet curing adhesive, and include pin-shaped light source members 321, which are provided in the four circular holes 241A formed in the base plate 241 and which emit ultraviolet light from their ends, and a main body 322 which supplies ultraviolet light to each of the light source members 321 through a flexible pipe 322A and which is accommodated inside the mounting table 4, as shown in FIG. 6.

When the main body 322 is operated, ultraviolet light is supplied to each of the light source members 321 through the flexible pipe 322A. The supplied ultraviolet light is emitted from the ends of the light source members 321 to the holes 143A at the four corners of the holding frame 143 for the liquid crystal panel 141R, 141G, or 141B.

FIG. 8 is a schematic that shows the critical portion of the adjusting light source device 31.

The adjusting light source device 31 adjusts the position of the liquid crystal panel 141R, 141G, or 141B. Referring to FIG. 8 as well as FIG. 7, the adjusting light source device 31 includes four light-emitting diodes (LED) 311 as light sources, an adjusting board 312 to adjust the LEDs 311 via a predetermined cable 312A so that the LEDs 311 emit a sufficient amount of light, glass diffusion plates 313 on which a diffusion sheet 313A is attached, the diffusion plates 313 being provided on the subsequent stages of the LEDs 311, and a fixing plate 314 to fix the diffusion plates 313.

In each of the LEDs 311, an LED element 311Y corresponding to each color is accommodated in a spherical case 311X. By applying a predetermined external current to the LED element 311Y, electron transitions are caused between energy levels so as to emit light.

The LED element 311Y includes three types of diode elements: a red diode element 311YR which emits red light having a wavelength of 613 nm, a green diode element 311YG which emits green light having a wavelength of 525 nm, and a blue diode element 311YB which emits blue light having a wavelength of 470 nm.

Therefore, by providing any one of the diode elements 311YR, 311YG, and 311YB in the case 311X, a red LED 311R, a green LED 311G, or a blue LED 311B can be formed.

In the adjusting light source device 31, there is an arrangement of four LEDs, all LEDs of the type of either 311R, or 311G, or 311B.

The adjusting board 312 is connected to each LED element 311Y (311YR, 311YG, or 311YB) of the four LEDs 31 (311R, 311G, or 311B) through the cable 312A, and applies a predetermined current to the LED elements 311Y (311YR, 311YG, or 311YB) so that each of the LEDs 311 (311R, 311G, or 311B) emits colored light having an adequate luminance and the predetermined wavelength.

Although the specific setting position of the adjusting board 312 is not shown, the adjusting board 312 is fixed to the side surface or the like of the six-axis position adjusting unit 20.

The diffusion plate 313 is a glass plate on which the diffusion sheet 313A is attached, and diffuses light emitted from the spherical surface of each of the LEDs 311 so as to generate diffused light corresponding to the shape of the rectangular image forming region of the liquid crystal panel 141R, 141G, or 141B.

The fixing plate 314 is a rectangular plate in which four circular holes 314A are formed at the positions corresponding to the circular holes 242B in the base portion 242. On the LED 311 side of the fixing plate 314, the diffusion plates 313 are fixed so as to cover the holes 314A.

In the adjusting light source device 31, all members except the cable 312A and the adjusting board 312 are accommodated in the base portion 242, as shown in FIG. 7. Herein, these accommodated members are placed so that the positions of the holes 314A in the fixing plate 314 correspond to the positions of the circular holes 242B in the base portion 242.

3-4 Construction of Luminous Flux Detector

In FIG. 4, the luminous flux detector 40 includes four charge-coupled device (CCD) cameras 41, although some of the cameras are not shown, and a movement mechanism 43 to adjust the three-dimensional position of the four CCD cameras 41.

Each of the CCD cameras 41 is an area sensor having a CCD as an image pickup device, and receives a luminous flux for position adjustment emitted from the cross dichroic prism 150 and outputs the luminous flux as an electrical signal.

FIG. 9 is a schematic showing the luminous flux detector 40.

As shown in FIG. 9, each of the CCD cameras 41 includes a main body 411, a case 412 to accommodate a lens 412A, and a mirror unit 413 in which a total reflection mirror 413A is accommodated at an angle of 45° with respect to the luminous flux emitting surface of the cross dichroic prism 150.

In the CCD camera 41, a luminous flux emitted from the cross dichroic prism 150 is received by the mirror unit 413, and the received luminous flux is totally reflected by substantially 90° at the total reflection mirror 413A. Then, the totally reflected luminous flux is detected by the main body 411 via the lens 412A.

Herein, since the lens 412A is accommodated in the case 412 and the total reflection mirror 413A is also accommodated in the mirror unit 413, the received luminous flux does not leak to the outside and is not affected by external light.

FIG. 10 is a front view showing the luminous flux detector 40 as viewed from line X—X of FIG. 9.

As shown in FIG. 10, the four CCD cameras 41 are placed corresponding to the diagonal lines of a rectangular image forming region PA formed on the liquid crystal panels 141R, 141G, and 141B, using the movement mechanism 43 (FIG. 4). In each of the CCD cameras 41, the zoom/focus can be freely adjusted by remote control in order to detect the projected image with high accuracy.

As shown schematically in FIG. 4, the movement mechanism 43 includes a column 431 provided on the mounting table 4, a plurality of axis members 432 which are attached to the column 431 and which can adjust the spatial position in the six axial directions, and camera-mounting portions 433 which are attached to the axis members 432 and on which the CCD cameras 41 are mounted.

By this movement mechanism 43, each of the CCD cameras 41 can move in the X-axis direction (horizontal direction in FIG. 10), in the Y-axis direction (vertical direction in FIG. 10), and in the Z-axis direction (direction orthogonal to the plane of FIG. 10) by a servo control mechanism (not shown) provided in the mounting table 4, as shown in FIG. 10.

FIG. 11 is a schematic showing the apparatus 2 for manufacturing the optical device.

As shown in FIG. 11, the main body 3 is electrically connected to the computer 70. The computer 70 includes a CPU and a storage device, and performs control of the operation of the six-axis position adjusting units 20 and the luminous flux detector 40 and image processing of luminous fluxes detected by the CCD cameras 41 of the luminous flux detector 40.

FIG. 12 is a schematic that shows a display screen 71 of the computer 70.

A program invoked by the computer 70 displays the display screen 71 shown in FIG. 12. Focus/alignment adjustment is performed based on various information displayed on the display screen 71.

The display screen 71 includes an image display view 72 to directly display the image from each of the CCD cameras 41 whose position is adjusted, an image processing view 73 to perform a pattern matching process of the images displayed on the image display view 72 based on a reference pattern image, and an axis-movement-amount display view 74 to display the amount of axis adjustment of the six-axis adjustment units 20 after image processing. On each of image display regions 72A to 72D of the image display view 72, an image obtained by each of the four luminous fluxes received by the four CCD cameras 41 is displayed.

4. Adjustment Operation by Position Adjusting Device

Next, a method for manufacturing the optical device 180 with the apparatus 2 for manufacturing the optical device by adjusting the position of each of the liquid crystal panels 141R, 141G, and 141B with respect to the cross dichroic prism 150 will be described with reference to the flowchart shown in FIG. 13.

(4-1) First, as preparation, a reference pattern for pattern matching in accordance with the type of projector and reference positions of the CCD cameras 41 are obtained. Specifically, a master optical device, whose focus position and an alignment position are adjusted in advance based on the characteristic of the projection lens 160 in each type, is set on the pedestal 10 (step S1). The master optical device includes a reference cross dichroic prism as a reference color-combining optical system and three reference liquid crystal panels for each color as reference light modulators incorporated therein.

(4-2) Next, a luminous flux for position adjustment is emitted from the adjusting light source device 31 of the light source unit 30 to the reference liquid crystal panel for G light of the master optical device so that the luminous flux emitted from the master optical device is directly received by the CCD cameras 41. At this time, the movement mechanism 43 is operated so that the CCD cameras 41 are moved to the position to receive the luminous flux reliably (step S2). Also, the images at this time are displayed on the image display regions 72A to 72D of the image display view 72.

At this time, a plurality of pixel regions CA corresponding to four corners of the reference liquid crystal panel are displayed as image, as shown in FIG. 14. The image is regarded as a reference pattern to provide pattern matching. Also, the positions of the CCD cameras 41 at this time are reference positions according to the type of device. A reference pattern is generated for each of the three reference liquid crystal panels, and the reference positions of the CCD cameras 41 are set for one reference liquid crystal panel. The reference patterns and the reference positions of the CCD cameras 41 are registered on the storage device of the computer 70 as device data according to the type of device. The foregoing steps S1 and S2 are performed for a plurality of types of device, and the reference pattern and the reference positions of the CCD cameras 41 for each type are registered as device data.

(4-3) Then, the cross dichroic prism 150 to be manufactured is set on the pedestal 10. Also, the suction device 244 is operated when the pins 145 having ultraviolet curing adhesive applied are inserted into the holes 143A so that the liquid crystal panels 141R, 141G, and 141B are held such that each of the liquid crystal panels is in contact with the pad 243 of the liquid crystal panel holder 24 (step S3).

(4-4) Next, an initialization process is performed with a program executed in the CPU by operating a keyboard, a mouse, and so on of the computer 70. In the initialization process, a memory, such as a random access memory (RAM), is initialized first. Also, in the initialization process, registered data in accordance with the type of the cross dichroic prism 150 and the liquid crystal panels 141R, 141G, and 141B to be adjusted is accessed, and the CCD cameras 41 are moved to and set in the reference positions. In this way, in the initialization process, a state to perform the manufacturing operation of the optical device 180 is obtained (step S4). Alternatively, step S4 can be performed just after step S1.

(4-5) Then, for example, a luminous flux for position adjustment is radiated to the liquid crystal panel 141G and a combined luminous flux emitted from the light emitting surface 152 (FIG. 3) of the cross dichroic prism 150 is detected by the CCD cameras 41 (step S5).

(4-6) The computer 70 performs focus/alignment adjustment of the liquid crystal panel 141G by moving the liquid crystal panel 141G with respect to the light-incident surface 151 of the cross dichroic prism 150 using the image processing function based on an input signal from the CCD cameras 41 (step S6).

(4-7) The focus/alignment adjustment is repeated until the image displayed on each of the image display regions 72A to 72D exactly corresponds to the position of the reference pattern image (step S7).

(4-8) After the focus/alignment adjustment, the main body 322 of the fixing light source device is operated, ultraviolet light (UV) is radiated from each of the light source members 321 to each of the pins 145, and the liquid crystal panel 141G is thus fixed (step S8).

(4-9) Further, after the adjustment of the liquid crystal panel 141G is completed, the other liquid crystal panels 141R and 141B are adjusted in the same way. That is, the foregoing steps are performed sequentially for each of the liquid crystal panels 141R and 141B (step 9). At this time, the reference pattern corresponding to each of the liquid crystal panels 141R and 141B is retrieved from the storage device and used.

In this way, the optical device 180 is manufactured with high accuracy.

5. Advantages

According to this embodiment, the following advantages can be obtained.

(1) The LEDs 311 are adopted for the adjusting light source device 31, and thus the power consumption required for manufacturing the optical device 180 can be reduced compared to the case where a known metal halide lamp is used. Also, the LEDs can be used semipermanently. Accordingly, energy can be saved, the cost for the adjusting light source device 31 can be reduced, and thus the cost for manufacturing the optical device 180 can be reduced. Furthermore, the adjusting light source device 31 and the apparatus 2 for manufacturing the optical device can be miniaturized.

(2) Since the diffusion plate 313 is placed on the subsequent stage of each of the LEDs 311, the luminous flux emitted from each of the LEDs 311 and projected on the liquid crystal panel 141R, 141G, or 141B in a spherical shape can be converted to diffused light according to the shape of the rectangular image forming region (pixel) of the liquid crystal panel 141R, 141G, or 141B. Accordingly, the whole of the liquid crystal panels 141R, 141G, and 141B can be projected accurately. Also, accurate detection can be realized by the light flux detector 40, and thus the optical device 180 can be manufactured with higher accuracy.

(3) The LEDs 311 illuminate the four corners of the image forming region PA of each of the liquid crystal panels 141R, 141G, and 141B, and the corresponding luminous flux detector 40 detects the four corners. Accordingly, four pixel regions can be detected in each of the liquid crystal panels 141R, 141G, and 141B, and thus the optical device 180 can be manufactured with higher accuracy based on the result obtained by detecting the four corners.

(4) The LED 311 has three advantages: three types of LED, that is, red, green, and blue, can be easily made simply by changing the material; the LED does not generate heat; and the light emission can be switched ON/OFF rapidly. By using the LED 311 as a light source, the foregoing three advantages can be enjoyed. Accordingly, the optical device 180, in which modulation can be performed for each of the light rays of three colors, can be easily manufactured. Also, overheating in the other parts of the apparatus 2 can be reduced or prevented so that the apparatus 2 can be easily used. Further, the optical device 180 can be manufactured rapidly.

(5) In the apparatus 2 for manufacturing the optical device, three types of LEDs 311R, 311G, and 311B for red, green, and blue, respectively, are used as the LEDs 311. Also, the LEDs 311 include all types of LEDs. Accordingly, the optical device 180 which can perform full-color output can be easily manufactured by using the three liquid crystal panels 141R, 141G, and 141B.

(6) Ultraviolet light is radiated from one main body 322 of the fixing light source device to the holes 143A at the four corners of the holding frame 143 almost simultaneously. Therefore, the radiation time of ultraviolet light can be shortened compared to the case where ultraviolet light is radiated to each of the holes 143A in order, and thus the optical device 180 can be rapidly manufactured and energy can be saved.

(7) Since the pad 243, with which each of the liquid crystal panels 141R, 141G, and 141B is brought into contact, includes a porous elastic member, the damage to the liquid crystal panels 141R, 141G, and 141B can be reduced or prevented.

(8) Each of the liquid crystal panels 141R, 141G, and 141B is held by a vacuum by using the suction device 244. Thus, the mechanism to hold the liquid crystal panels 141R, 141G, and 141B can be simplified compared to the case where each of the liquid crystal panels is held by clamping.

(9) The total reflection mirror 413A and the lens 412A are accommodated inside each of the CCD cameras 41 so that each of the CCD cameras 41 operates completely independently. Accordingly, the construction of the luminous flux detector 40 can be simplified.

(10) The total reflection mirror 413A is placed inside the mirror unit 413 and the lens 412A is placed inside the case 412. Accordingly, an introduced luminous flux is not leaked to the outside and is not affected by external light.

(11) Since the luminous flux detector 40 includes four CCD cameras 41, the four corners of each of the liquid crystal panels 141R, 141G, and 141B are separately imaged by each of the CCD cameras 41 so that the images can be displayed on the image display regions 72A to 72D. By performing focus/alignment adjustment at all imaging portions while viewing the display of each of the image display regions 72A to 72D, the adjustment can be performed with higher accuracy.

(12) The four CCD cameras 41 are placed on the diagonal lines of the rectangular image forming region PA of each of the liquid crystal panels 141R, 141G, and 141B. Accordingly, interference among the CCD cameras 41 can be reduced or prevented, and the movement mechanism 43 and so on can be placed by using effective spaces between the CCD cameras 41.

(13) Position adjustment is repeatedly performed for each of the liquid crystal panels 141R, 141G, and 141B. Accordingly, the common CCD cameras 41 can be used for adjustment of each of the liquid crystal panels 141R, 141G, and 141B, and only four CCD cameras 41 are required for the adjustment of all of the liquid crystal panels 141R, 141G, and 141B.

6. Modification

The present invention is not limited to the above described embodiment and includes other constructions for achieving advantages of the present invention. Also, a modification described below is included in the present invention, for example.

For example, an LED is used as a self-light-emitting element. However, other types of self-light-emitting element, for example, an organic EL element, can be used.

Also, three types of LED, that is, a red LED, a green LED, and a blue LED, are used as LEDs. However, other types of LEDs may be used, or some of the three types of LEDs may be used.

Further, red, green, and blue light sources can be formed by attaching red, green, and blue filters to white LEDs.

Four LEDs are placed at four predetermined positions in one adjusting light source device. However, the positions and the number of LEDs are not limited.

The wavelength of the luminous flux emitted from each of the LED elements is not limited to the aforementioned wavelength, and can be arbitrarily varied according to the purpose, within the predetermined range.

A glass diffusion plate is placed on the subsequent stage of each of the LEDs. The diffusion plate may include other material, such as a resin, and the form does not have to be a plate, but another form, such as sheet, may be adopted. Also, the number is not limited. That is, a member to diffuse the luminous flux emitted from the LED and to illuminate evenly the image forming region of the liquid crystal panel should be placed on the subsequent stage of the LED.

Further, in the above-described embodiment, the liquid crystal panels 141R, 141G, and 141B are used as light modulators to modulate light according to an image signal. However, a device using a micro mirror may be used as a light modulator to modulate light, and the present invention can be applied to adjust the position of things other than liquid crystal panels.

Also, the present invention can be applied to a reflective liquid crystal panel of liquid crystal on silicon (LCOS) type.

Further, in the above-described embodiment, the position of each of the liquid crystal panels 141R, 141G, and 141B is adjusted by directly detecting the combined light emitted from the cross dichroic prism 150 with the CCD cameras 41. However, a screen may be provided on the subsequent stage of the projection lens 160 so that a projected image on the screen may be indirectly detected by the CCD cameras. However, the construction of the above-described embodiment is more advantageous in the point of miniaturization in the apparatus 2 for manufacturing the optical device.

In the above-described embodiment, the optical device 180 is incorporated into the projector 100. However, the optical device 180 may be mounted on another optical equipment.

The specific construction and form of the present invention may be modified as long as advantages of the present invention can be achieved.

Advantages

As described above, according to the apparatus for manufacturing the optical device of the present invention, energy can be saved. Also, the cost for the adjusting light source device can be reduced and an inexpensive optical device can be manufactured. Further, the adjusting light source device can be miniaturized.

What is claimed is:

1. An apparatus for manufacturing an optical device, the apparatus performing mutual position adjustment of each of a plurality of light modulators and fixing each of the light modulators to a light-incident surface of a color-combining optical system, in order to manufacture the optical device including the plurality of light modulators, each of which modulates each of a plurality of colored light rays according to image information, and the color-combining optical system to combine the colored light rays modulated in the light modulators, the apparatus comprising:

an adjusting light source device including a plurality of light sources to supply colored light rays to be modulated to each of the light modulators, the light sources including self-light-emitting elements;

a luminous flux detector to detect a luminous flux emitted from the adjusting light source device and passed through each of the light modulators and the color-combining optical system; and a position adjusting device to adjust the position of each of the light modulators based on the luminous flux detected by the luminous flux detector.

2. The apparatus according to claim 1, the adjusting light source device including a diffusion plate at a subsequent stage of each of the light sources.

3. The apparatus according to claim 1, the self-light-emitting elements being placed corresponding to four corners of a rectangular image forming region in the light modulators.

4. The apparatus according to claim 1, each of the self-light-emitting elements including a light-emitting diode.

5. The apparatus according to claim 4, the plurality of light sources including a red light-emitting diode, a green light-emitting diode, and a blue light-emitting diode.

* * * * *

UNITED STATES PATENT AND TRADEMARK OFFICE
CERTIFICATE OF CORRECTION

PATENT NO. : 6,741,397 B2
DATED : May 25, 2004
INVENTOR(S) : Masashi Kitabayashi It is certified that error appears in the above-identified patent and that said Letters Patent is hereby corrected as shown below:

Title page,
Item [75], Inventor, replace "Masashi Kitabayashi, Nagano-Ken" with -- Masashi Kitabayashi, Horigane-mura --

Signed and Sealed this

Twenty-third Day of November, 2004

JON W. DUDAS
*Director of the United States Patent and Trademark Office*